United States Patent
Lucido et al.

(10) Patent No.: US 10,161,340 B1
(45) Date of Patent: Dec. 25, 2018

(54) FUEL INJECTION SYSTEM AND METHOD FOR A VEHICLE PROPULSION SYSTEM

(71) Applicant: GM GLOBAL TECHNOLOGY OPERATIONS LLC, Detroit, MI (US)

(72) Inventors: Michael J Lucido, Northville, MI (US); Jonathan T Shibata, Whitmore Lake, MI (US)

(*) Notice: Subject to any disclaimer, the term of this patent is extended or adjusted under 35 U.S.C. 154(b) by 0 days.

(21) Appl. No.: 15/722,248

(22) Filed: Oct. 2, 2017

(51) Int. Cl.
- F02D 41/00 (2006.01)
- F02D 41/22 (2006.01)
- F02D 41/40 (2006.01)
- F02D 41/38 (2006.01)
- F02D 41/20 (2006.01)

(52) U.S. Cl.
CPC ......... F02D 41/221 (2013.01); F02D 41/402 (2013.01); F02D 2041/2051 (2013.01); F02D 2041/2055 (2013.01); F02D 2041/389 (2013.01)

(58) Field of Classification Search
CPC .............. F02D 41/221; F02D 41/402; F02D 2041/2051; F02D 2041/2055; F02D 2041/389
See application file for complete search history.

(56) References Cited

U.S. PATENT DOCUMENTS

| | | | |
|---|---|---|---|
| 5,915,368 A * | 6/1999 | Ishida | F02D 41/047 |
| | | | 123/675 |
| 6,088,647 A * | 7/2000 | Hemberger | F02D 41/008 |
| | | | 123/478 |
| 6,092,017 A * | 7/2000 | Ishida | F02D 41/1404 |
| | | | 701/106 |
| 6,324,529 B1 * | 11/2001 | Kamihira | F02D 41/1401 |
| | | | 706/13 |
| 7,765,053 B2 | 7/2010 | Gwidt et al. | |
| 7,931,008 B2 | 4/2011 | Verner et al. | |
| 8,676,476 B2 | 3/2014 | Malikopoulos | |
| 8,679,691 B2 | 3/2014 | Lang et al. | |
| 8,751,135 B2 | 6/2014 | Girotto et al. | |
| 9,074,552 B2 | 7/2015 | Shibata et al. | |
| 9,169,789 B2 | 10/2015 | Cowgill et al. | |
| 9,458,789 B2 * | 10/2016 | Lucido | F02D 41/20 |
| 9,683,510 B2 | 6/2017 | Shibata et al. | |
| 9,708,998 B2 | 7/2017 | Shibata et al. | |
| 2003/0158709 A1 * | 8/2003 | Ishida | F02D 41/1405 |
| | | | 702/189 |
| 2011/0305998 A1 * | 12/2011 | Toedter | F02P 3/01 |
| | | | 431/2 |
| 2015/0275807 A1 * | 10/2015 | Lucido | F02D 41/3005 |
| | | | 701/103 |

* cited by examiner

Primary Examiner — Thomas Moulis (57) ABSTRACT

A fuel injection system for a vehicle propulsion system includes an injector driver module that applies power to a fuel injector of an engine in the vehicle propulsion system for a fuel injection event, a voltage measuring module that measures first and second voltages at first and second electrical connectors of the fuel injector, a voltage difference module that determines a difference between the first and second voltages, and a diagnostic module with a pattern based neural network that determines whether the fuel injector injected fuel based on the difference between the first and second voltages.

18 Claims, 7 Drawing Sheets

FUEL INJECTION SYSTEM AND METHOD FOR A VEHICLE PROPULSION SYSTEM

FIELD

The present disclosure relates to a control system and method for a vehicle propulsion system.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Air is drawn into an engine through an intake manifold. A throttle valve and/or engine valve timing controls airflow into the engine. The air mixes with fuel from one or more fuel injectors to form an air/fuel mixture. The air/fuel mixture is combusted within one or more cylinders of the engine. Combustion of the air/fuel mixture may be initiated by, for example, spark provided by a spark plug.

Combustion of the air/fuel mixture produces torque and exhaust gas. Torque is generated via heat release and expansion during combustion of the air/fuel mixture. The engine transfers torque to a transmission via a crankshaft, and the transmission transfers torque to one or more wheels via a driveline. The exhaust gas is expelled from the cylinders to an exhaust system.

An engine control module (ECM) controls the torque output of the engine. The ECM may control the torque output of the engine based on driver inputs. The driver inputs may include, for example, accelerator pedal position, brake pedal position, and/or one or more other suitable driver inputs.

An engine control module (ECM) may actuate a fuel injector using a voltage/current pulse. A fuel injector may fail to inject fuel when a pulse is applied. The engine control module may measure a feedback voltage from the injector in order to determine whether the fuel injector injected fuel in response to receiving the pulse. However, it has been difficult to accurately diagnose a missing fuel injection, especially when smaller fuel quantities and small dwell times as in, for example, a multiple fuel injection control strategy where multiple fuel injections are provided for each combustion event. Further, some fuel injectors have a weak feedback voltage signal which makes it difficult to rely upon a differential voltage signal to diagnose a missing fuel injection using previous methods and systems. Additionally, other conditions, such as, for example, a variation in temperature, may also adversely impact the accuracy with which missing injection may be diagnosed.

The challenges which have been faced in diagnosing and responding to a missing injection is exasperated in a multiple injection system in which fuel is injected multiple times for each combustion event. The amount of fuel for each injection in a multiple injection scheme is reduced in comparison to a single injection scheme. The uncertainty in diagnosing a missing injection at lower quantities has resulted in the multiple injection schemes being limited in how small the amount of fuel may be injected while maintaining the ability to diagnose that system.

Additionally, it is preferable to diagnose and respond to every fuel injection pulse to determine whether an injection was missed. In those systems operating according to a multiple injection scheme, the calculation throughput of an engine control module to diagnose a missing injection is quite high. It is desirable to reduce the computational complexity of the diagnosis which may improve the speed of diagnosis and thereby place further limitations on the overall fuel injection scheme. A highly complex diagnostic and control scheme places a lower limit on the speed of the fuel injection scheme.

Moreover, fuel injectors are available in many different design configurations each of which have previously required calibration for each individual vehicle propulsion system which may use a varying design of injector. This results in a high calibration workload. The variance of injectors in their operating tolerances and specifications also add to the complexity which only adds to the calibration workload. Additionally, the variability of the viscosity of the fuel presents a challenge due to the impact on the speed of the fuel injectors opening and closing.

SUMMARY

In an exemplary aspect, a fuel injection system for a vehicle propulsion system includes an injector driver module that applies power to a fuel injector of an engine in the vehicle propulsion system for a fuel injection event, a voltage measuring module that measures first and second voltages at first and second electrical connectors of the fuel injector, a voltage difference module that determines a difference between the first and second voltages, and a diagnostic module with a pattern based neural network that determines whether the fuel injector injected fuel based on the difference between the first and second voltages.

In this manner, control over fuel injection may be more reliably controlled over a wider variety of fuel injector designs and operating conditions, minimum fuel quantities for each injection may be reduced, which may, for example, enable injector cooling in dual fuel system applications, weak differential voltages from fuel injectors have a reduced adverse effect, fuel injection may be reliably controlled for a wider variety of fuel injectors, processing workload and bandwidth may be reduced, calibration workload may be significantly reduced, and significant improvements in fuel economy, efficiency, performance, and emissions may be achieved.

In another exemplary embodiment, the pattern based neural network determines whether the fuel injector injected fuel by rescaling, weighting and summing a difference between the first and second voltages.

In another exemplary embodiment, the pattern based neural network determines whether the fuel injector injected fuel by applying a bias with a hidden layer of the pattern based neural network.

In another exemplary embodiment, the pattern based neural network determines whether the fuel injector injected fuel by applying a weight and bias in an exponential function of an output layer of the pattern based neural network.

In another exemplary embodiment, the pattern based neural network determines whether the fuel injector injected fuel by further applying a second exponential function.

In another exemplary embodiment, the system further includes a malfunction indicator lamp that illuminates in response to the diagnostic module determining that the fuel injector did not inject fuel.

In another exemplary embodiment, the diagnostic module stores a predetermined diagnostic trouble code in memory when the fuel injector did not inject fuel.

In another exemplary embodiment, the diagnostic module disables a second fuel injection event in a multiple fuel injection scheme in response to the diagnostic module determining that the fuel injector did not inject fuel.

In another exemplary embodiment, the injector driver module switches from a multiple fuel injection scheme to a single fuel injection scheme for each combustion event in response to the diagnostic module determining that the fuel injector did not inject fuel.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine combusts a mixture of air and fuel within cylinders to generate drive torque. A throttle valve regulates airflow into the engine. Fuel is injected by fuel injectors. Spark plugs may generate spark within the cylinders to initiate combustion. Intake and exhaust valves of a cylinder may be controlled to regulate flow into and out of the cylinder.

The fuel injectors receive fuel from a fuel rail. A high pressure fuel pump receives fuel from a low pressure fuel pump and pressurizes the fuel within the fuel rail. The low pressure fuel pump draws fuel from a fuel tank and provides fuel to the high pressure fuel pump. The fuel injectors inject fuel directly into the cylinders of the engine.

As explained previously, different fuel injectors, however, may have different operating characteristics. For example, fuel injectors from different fuel injector manufacturers may have different operating characteristics. Even fuel injectors from the same fuel injector manufacturer, however, may have different operating characteristics. Example operating characteristics include, for example, opening period and closing period. The opening period of a fuel injector may refer to the period between a first time when power is applied to the fuel injector to open the fuel injector and a second time when the fuel injector actually opens in response to the application of power. The closing period of a fuel injector may refer to the period between a first time when power is removed from the fuel injector to close the fuel injector and a second time when the fuel injector reaches a fully closed state in response to the removal of power.

Figure 1:
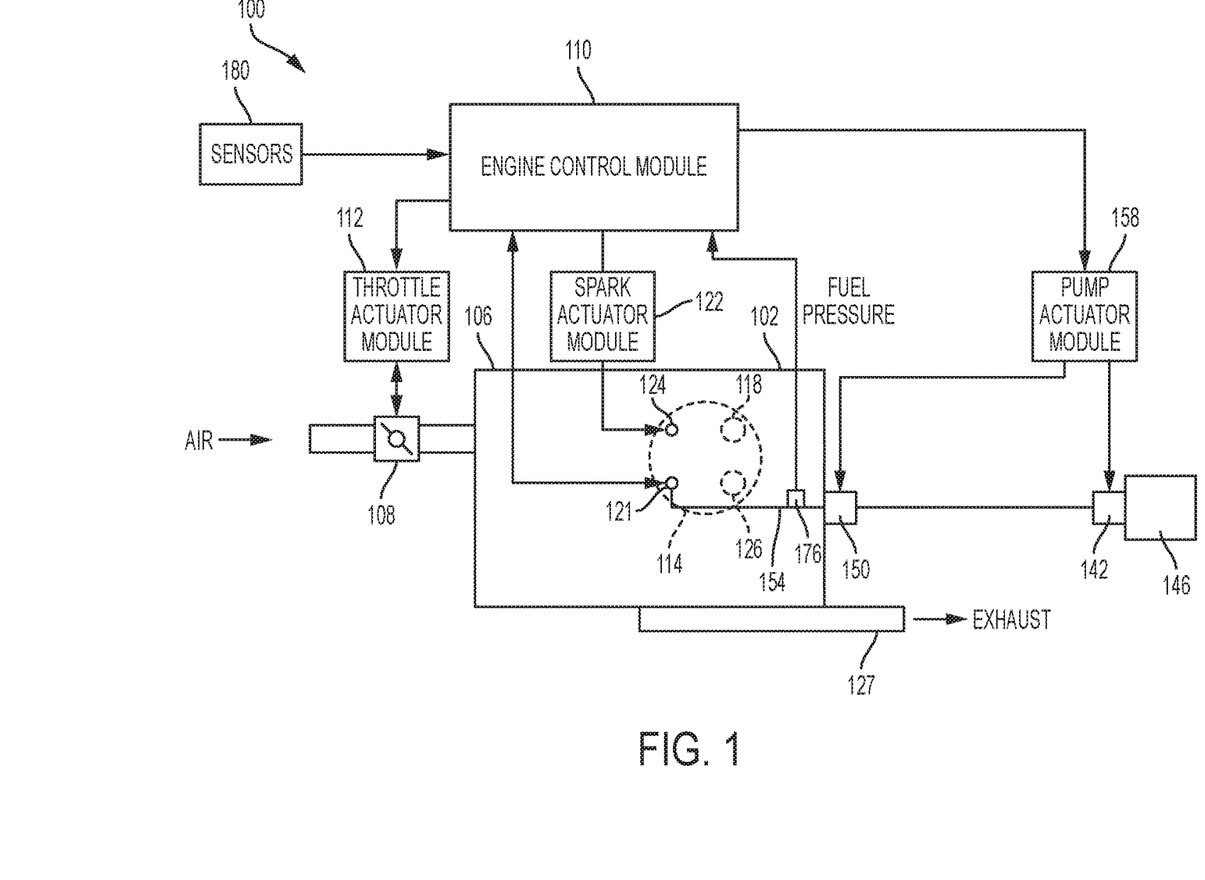
FIG. 1 is a functional block diagram of an exemplary direct injection engine system for a vehicle propulsion system.

Referring now to FIG. 1, a functional block diagram of an exemplary vehicle propulsion system 100 is presented. The vehicle propulsion system 100 includes an engine 102 that combusts an air/fuel mixture to produce drive torque for a vehicle. While the engine 102 will be discussed as a spark ignition direct injection (SIDI) engine, the engine 102 may include another type of engine. One or more electric motors and/or motor generator units (MGUs) may be provided with the engine 102.

Air is drawn into an intake manifold 106 through a throttle valve 108. The throttle valve 108 may vary airflow into the intake manifold 106. For example only, the throttle valve 108 may include a butterfly valve having a rotatable blade. An engine control module (ECM) 110 controls a throttle actuator module 112 (e.g., an electronic throttle controller or ETC), and the throttle actuator module 112 controls opening of the throttle valve 108.

Air from the intake manifold 106 is drawn into cylinders of the engine 102. While the engine 102 may include more than one cylinder, only a single representative cylinder 114 is shown. Air from the intake manifold 106 is drawn into the cylinder 114 through an intake valve 118. One or more intake valves may be provided with each cylinder.

The ECM 110 controls fuel injection into the cylinder 114 via a fuel injector 121. The fuel injector 121 injects fuel, such as gasoline, directly into the cylinder 114. The fuel injector 121 may be a solenoid type, direct injection fuel injector. Solenoid type, direct injection fuel injectors are different than port fuel injection (PFI) injectors and piezo electric fuel injectors. The ECM 110 may control fuel injection to achieve a desired air/fuel ratio, such as a stoichiometric air/fuel ratio. A fuel injector may be provided for each cylinder.

The injected fuel mixes with air and creates an air/fuel mixture in the cylinder 114. Based upon a signal from the ECM 110, a spark actuator module 122 may energize a spark plug 124 in the cylinder 114. A spark plug may be provided for each cylinder. Spark generated by the spark plug 124 ignites the air/fuel mixture.

The engine 102 may operate using a four-stroke cycle or another suitable operating cycle. The four strokes, described below, may be referred to as the intake stroke, the compression stroke, the combustion stroke, and the exhaust stroke. During each revolution of a crankshaft (not shown), two of the four strokes occur within the cylinder 114. Therefore, two crankshaft revolutions are necessary for the cylinders to experience all four of the strokes.

During the intake stroke, air from the intake manifold 106 is drawn into the cylinder 114 through the intake valve 118. Fuel injected by the fuel injector 121 mixes with air and creates an air/fuel mixture in the cylinder 114. One or more fuel injections may be performed during a combustion cycle. During the compression stroke, a piston (not shown) within the cylinder 114 compresses the air/fuel mixture. During the combustion stroke, combustion of the air/fuel mixture drives the piston, thereby driving the crankshaft. During the exhaust stroke, the byproducts of combustion are expelled through an exhaust valve 126 to an exhaust system 127.

A low pressure fuel pump 142 draws fuel from a fuel tank 146 and provides fuel at low pressures to a high pressure fuel pump 150. While only the fuel tank 146 is shown, more than one fuel tank 146 may be implemented. The high pressure fuel pump 150 further pressurizes the fuel within a fuel rail 154. The fuel injectors of the engine 102, including the fuel injector 121, receive fuel via the fuel rail 154. Low pressures provided by the low pressure fuel pump 142 are described relative to high pressures provided by the high pressure fuel pump 150.

The low pressure fuel pump 142 may be an electrically driven pump. The high pressure fuel pump 150 may be a variable output pump that is mechanically driven by the engine 102. A pump actuator module 158 may control output of the high pressure fuel pump 150 based on signals from the ECM 110. The pump actuator module 158 may also control operation (e.g., ON/OFF state) of the low pressure fuel pump 142.

The engine system 100 includes a fuel pressure sensor 176. The fuel pressure sensor 176 measures a pressure of the fuel in the fuel rail 154. The engine system 100 may include one or more other sensors 180. For example, the other sensors 180 may include one or more other fuel pressure sensors, a mass air flowrate (MAF) sensor, a manifold absolute pressure (MAP) sensor, an intake air temperature (IAT) sensor, a coolant temperature sensor, an oil temperature sensor, a crankshaft position sensor, and/or one or more other suitable sensors.

Figure 2:
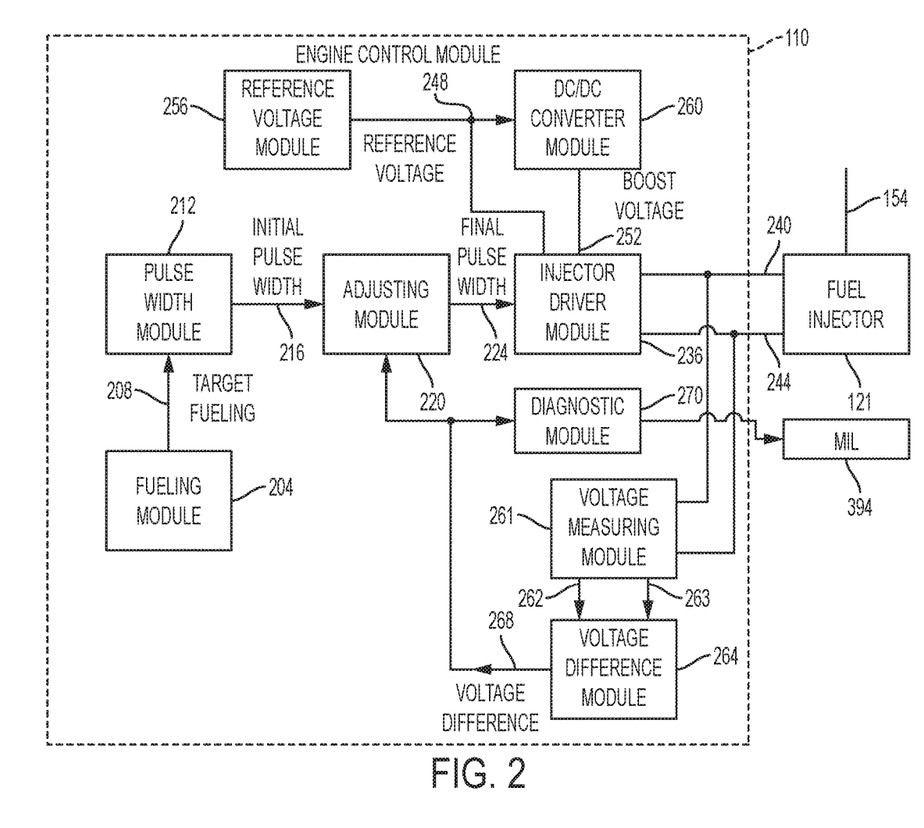
FIG. 2 is a functional block diagram of an exemplary fuel control system for a vehicle propulsion system.

Referring now to FIG. 2, a functional block diagram of an example fuel control system including an example portion of the ECM 110 is presented. A fueling module 204 determines target fuel injection parameters 208 for a fuel injection event of the fuel injector 121. For example, the fueling module 204 may determine a target mass of fuel for the fuel injection event and a target starting timing for the fuel injection event. The fueling module 204 may determine the target mass of fuel, for example, based on a target air/fuel ratio (e.g., stoichiometry) and an expected mass of air within the cylinder 114 for the fuel injection event. One or more fuel injection events may be performed during a combustion cycle of the cylinder 114.

A pulse width module 212 determines an initial (fuel injection) pulse width 216 for the fuel injection event based on the target mass of fuel. The pulse width module 212 may determine the initial pulse width 216 further based on pressure of the fuel within the fuel rail 154 and/or one or more other parameters. The initial pulse width 216 corresponds to a period to apply power to the fuel injector 121 during the fuel injection event to cause the fuel injector 121 to inject the target mass of fuel under the operating conditions.

Different fuel injectors, however, may have different closing periods, opening periods, opening magnitudes, and other characteristics. The closing period of a fuel injector may refer to the period between: a first time when power is removed from the fuel injector to close the fuel injector; and a second time when the fuel injector actually becomes closed and stops injecting fuel. Fuel injectors with longer closing periods will inject more fuel than fuel injectors with shorter closing periods despite all of the fuel injectors being controlled to inject the same amount of fuel.

The opening period of a fuel injector may refer to the period between: a first time when power is applied to the fuel injector to open the fuel injector; and a second time when the fuel injector actually becomes open and begins injecting fuel. Fuel injectors with longer opening periods will inject less fuel than fuel injectors with shorter opening periods despite all of the fuel injectors being controlled to inject the same amount of fuel. The opening magnitude of a fuel injector may correspond to how much the fuel injector opens for a fuel injection event.

An adjusting module 220 adjusts the initial pulse width 216 based on one or more injector parameters determined for the fuel injector 121 to produce a final pulse width 224. The adjustment of the initial pulse width 216 may include lengthening or shortening the initial pulse width 216 to determine the final pulse width 224, such as by advancing or retarding a beginning of the pulse and/or advancing or retarding an ending of the pulse.

An injector driver module 236 determines a target current profile (not shown) based on the final pulse width 224. The injector driver module 236 applies high and low voltages to first and second electrical connectors of the fuel injector 121 via high and low side lines 240 and 244 to achieve the target current profile through the fuel injector 121 for the fuel injection event.

The injector driver module 236 may generate the high and low voltages using reference and boost voltages 248 and 252. The reference and boost voltages 248 and 252 may be direct current (DC) voltages. A reference voltage module 256 provides the reference voltage 248, for example, based on a voltage of a battery (not shown) of the vehicle. A DC/DC converter module 260 boosts (increases) the reference voltage 248 to generate the boost voltage 252.

A voltage measuring module 261 measures the high voltage at the first electrical connector of the fuel injector 121 and generates a high side voltage 262 based on the voltage at the first electrical conductor. The voltage measuring module 261 also measures the low voltage at the second electrical connector of the fuel injector 121 and generates a low side voltage 263 based on the voltage at the second electrical conductor. The voltage measuring module 261 measures the high and low voltages relative to a ground reference potential.

A voltage difference module 264 generates a voltage difference 268 based on a difference between the low side voltage 263 and the high side voltage 262. For example, the voltage difference module 264 may set the voltage difference 268 equal to the low side voltage 263 minus the high side voltage 262. For another example, the voltage difference module 264 may set the voltage difference 268 equal to the high side voltage 262 minus the low side voltage 263. The voltage difference module 264 samples the low side voltage 263 and the high side voltage 262 and generates values of the voltage difference 268 based on a predetermined sampling rate. A filter, such as a low pass filter (LPF) or another suitable type of filter, may be implemented to filter the voltage difference 268. An analog to digital converter (ADC) may also be implemented such that the voltage difference 268 includes corresponding digital values. Further, digital filtering of the differential voltage signal using finite impulse response (FIR) filters may also be used.

A diagnostic module 270 diagnoses missed fueling events of the fuel injector 121. A missed fueling event may refer to a fuel injection event of a fuel injector where the fuel injector failed to open in response to the application of power to the fuel injector. Missed fueling events may be more likely to occur when a fuel injector is to perform multiple shorter fuel injection events per combustion cycle.

The diagnostic module 270 determines whether a missed fueling event occurred based on an analysis of the voltage difference signal 268 as will be described in more detail below.

Previous diagnostic modules may have determined whether a missed fueling event occurred based on the opening magnitude determined for a fuel injection event of the fuel injector 121. Such a system is described in, for example, co-assigned U.S. Pat. No. 9,458,789 the disclosure of which is incorporated herein in its entirety. In that disclosure, the diagnostic module 270 determines a predetermined opening magnitude for the fuel injection event based on the fuel pressure 380 of the fuel injection event. The predetermined opening magnitude may correspond to a minimum opening magnitude where the fuel injector 121 opened and injected fuel during the fuel injection event. An opening magnitude of greater than the predetermined opening magnitude may indicate that the fuel injector 121 opened and injected fuel. An opening magnitude of less than the predetermined opening magnitude may indicate that the fuel injector 121 failed to open and did not inject fuel. In the disclosure of U.S. Pat. No. 9,458,789, the diagnostic module 270 may indicate the occurrence of a missed fueling event when the opening magnitude of a fuel injection event is less than the predetermined opening magnitude of the fuel injection event. Conversely, the diagnostic module 270 may indicate that the fuel injection event was successful when the opening magnitude is greater than the predetermined opening magnitude.

In accordance with an exemplary embodiment of the present disclosure, the diagnostic module 270 may diagnose a missed fueling fault with the fuel injector 121 when one or more missed fueling events occur for the fuel injector 121. For example only, the diagnostic module 270 may diagnose a missed fueling fault with the fuel injector 121 when at least X missed fueling events are diagnosed during Y fuel injection events of the fuel injector 121. X and Y are predetermined values that are integers greater than zero, and Y is less than or equal to X.

The diagnostic module 270 may take one or more remedial actions when a missed fueling fault is diagnosed. For example, the diagnostic module 270 may set a predetermined diagnostic trouble code (DTC) in memory. The predetermined DTC may be indicative of the occurrence of a missed fueling fault with the fuel injector 121. The diagnostic module 270 may additionally illuminate a malfunction indicator lamp (MIL) 394 when a missed fueling fault is diagnosed. The diagnostic module 270 may additionally or alternatively perform one or more other remedial actions when a missed fueling fault is diagnosed, such as disabling the use of multiple fuel injection events per combustion cycle and limiting the number of fuel injection events per combustion cycle to one. For example, the diagnostic module 270 may disable a second or subsequent injection in a multiple injection cycle and/or cause the ECM to exit a cold start mode if the ECM is operating in a cold start mode.

While the present application is discussed in terms of diagnosing missed fueling events of the fuel injector 121, the present application is more generally applicable to diagnosing failure of a solenoid to open in response to an application of power. For example, the present application is applicable to diagnosing the failure to open of an oil control solenoid (e.g., for variable valve actuation), diesel fuel injectors, pressure control solenoids, and other types of solenoids without limitation.

Figure 3:
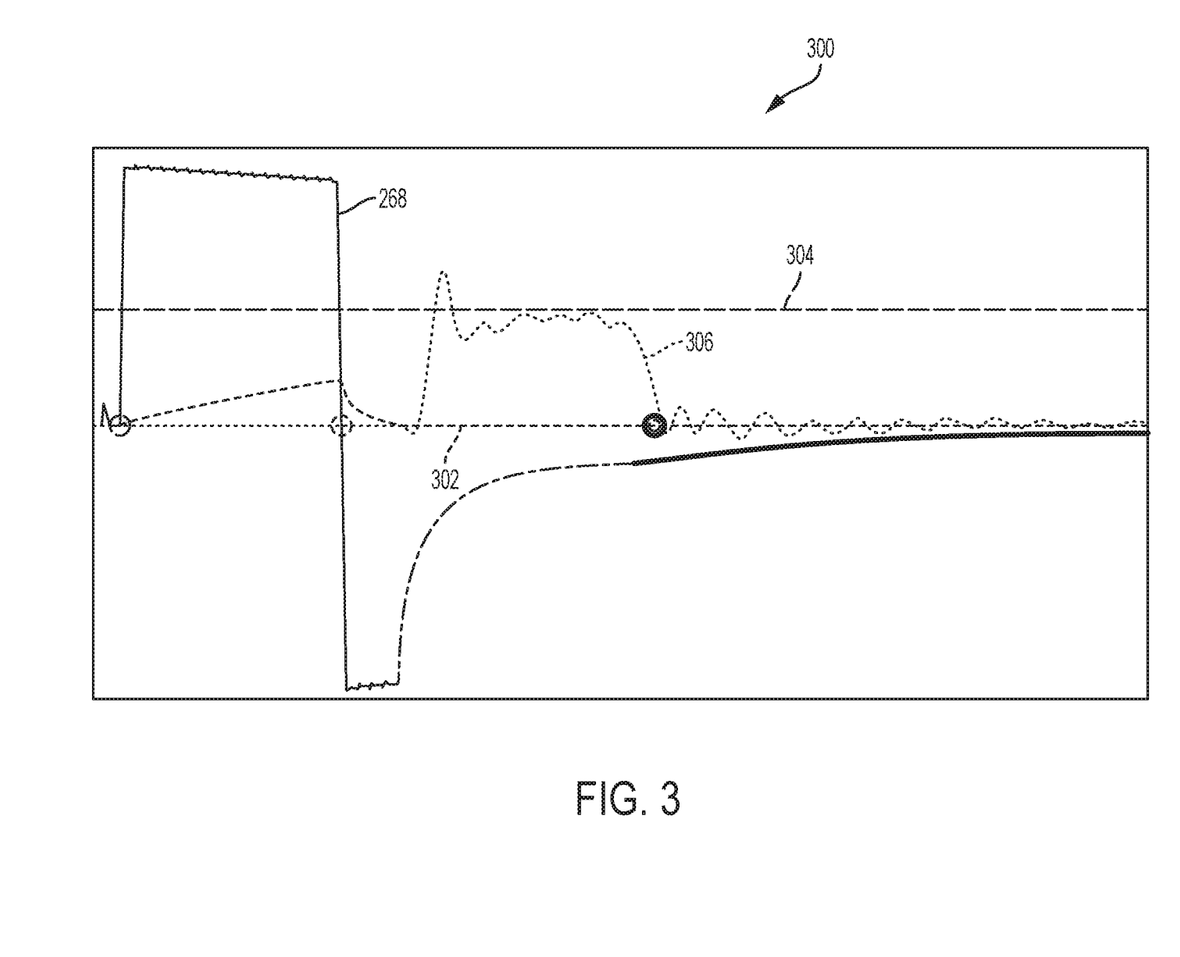
FIG. 3 is a graph 300 of voltage and current of an exemplary fuel injector, and various parameters determined based on the voltage for an injection event.

FIG. 3 is a graph 300 of voltage and current of an exemplary fuel injector, and various parameters determined based on the voltage for an injection event. The graph illustrates the differential voltage (or voltage difference) 268 across the fuel injector circuit, current 302 through the fuel injector, fuel pressure 304, and fuel flow 306 versus time for a fuel injection event. By processing the natural log of the differential voltage 268, the exponential decay rates may be differentiated into linear slopes for easier analysis and increased signal to noise capability. By using the natural log of the voltage, less filtering is required of the raw voltage signal which reduces the demand on processor bandwidth and allows for injections pulses to be more closely space due to the decrease in phase delay.

In a conventional missing fuel injection diagnostic system, the differential voltage across a fuel injector may have been analyzed to infer an opening magnitude and a closing time. The slopes of a natural log of the differential voltage may be analyzed and differentiated and where that crosses a particular threshold infers a closing time and the change in the slope of the natural log may be an indicator of how much the injector opened. The maximum of the delta of the natural log of the differential voltage may be an indicator of fuel injector opening magnitude. However, at small pulses or small fuel quantities, this conventional system was susceptible of false positives. In other words, this conventional system may have inferred a fuel injection when, in fact, there was no fuel injection. Therefore, these systems provided a limit on how small of a quantity of fuel could be reliably controlled.

Figure 4:
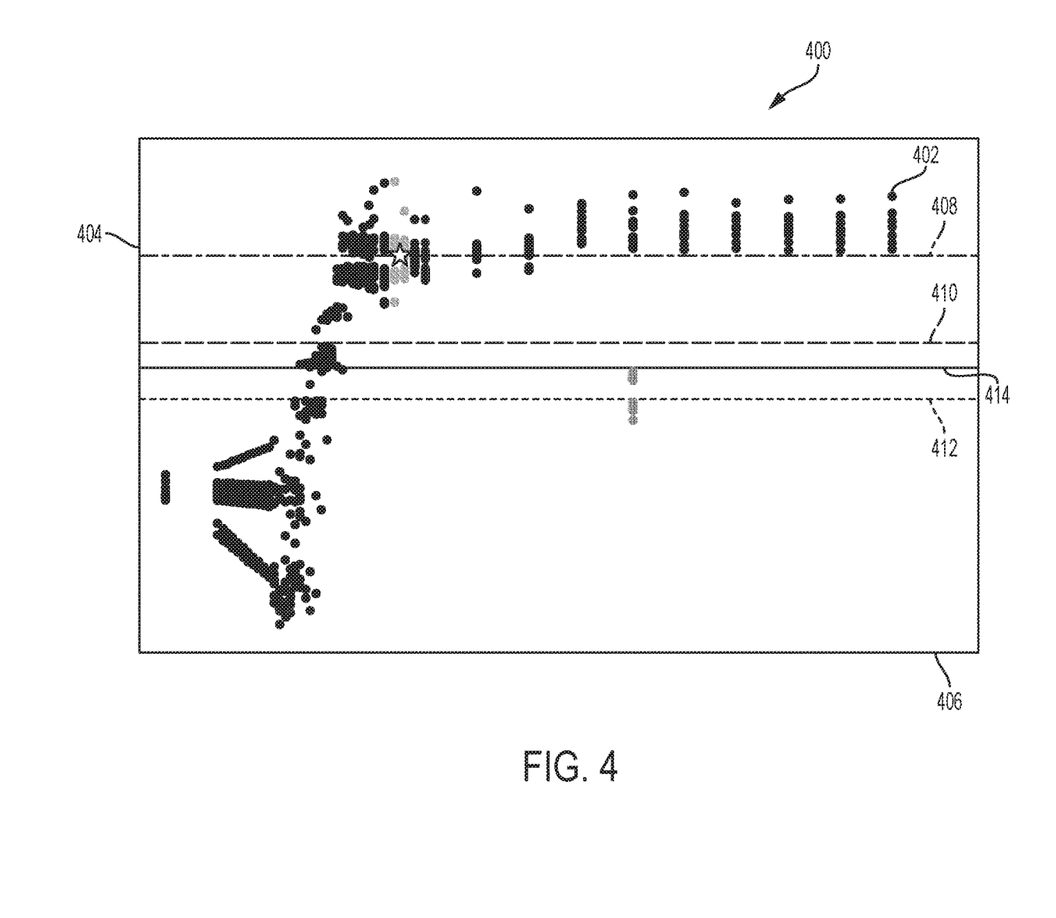
FIG. 4 is a graph 400 illustrating the statistical separation of missing pulse diagnostic for a traditional missing pulse diagnostic system and method.

FIG. 4 is a graph 400 illustrating the statistical separation of missing pulse diagnostic for a traditional missing pulse diagnostic system and method. A minimum fuel mass which may be reliably controlled may be selected using a statistical analysis that results in a satisfactory separation between data sets which indicate a pulse which results in a fuel injection and a pulse which does not result in a fuel injection. Each dot 402 on the graph 400 illustrates the missing pulse diagnostic for individual fuel injection events. The vertical axis 404 represents the opening magnitude and the horizontal axis 406 represents the pulse width. Line 408 represents the average of a good pulse (successful fuel injection) and then four sigma from that average is line 410. Line 412 represents the average of a bad pulse (unsuccessful fuel injection) and then two sigma from that is line 414. It is preferable to have a method and system where the diagnostic inference of the success of a fuel injection event results in a wide separation between lines 410 and 414. With this statistical method, a minimum fuel amount may be selected which results in satisfactory separation. However, as explained previously, this minimum fuel mass has been limited to how low of a fuel mass may be reliably controlled using conventional methods and systems. In the exemplary system which provided the data for FIG. 4, the minimum fuel was 6.7 milligrams. The minimum fuel quantity may be critically important for fuel injection systems which provide multiple fuel injection events for each combustion event.

In contrast to the previously described conventional method and system, the inventors developed a method and system which uses machine learning via a pattern based neural network to identify differential voltage signals that reliably distinguishes between a fuel injection event which delivers fuel and a fuel injection event which does not deliver fuel. In an exemplary embodiment, the inventive system and method may incorporate a neural network having one hidden layer to reduce processing workload. This is especially important in systems and methods which diagnose every fuel injection event in a multiple injection scheme. In an exemplary embodiment, the pattern based neural network is trained using fuel injector data from nominal fuel injectors, aged fuel injectors, limit fuel injectors, and stuck injector profiles along with the corresponding fuel mass rate of injection signal. As an injector ages, the operating characteristics change, therefore, the neural network may be trained with aged injectors. A limit fuel injector is an injector having operating characteristics that reside at the limits of specified ranges. These limit injectors may have operating characteristics, such as, for example, an opening time which is at the maximum specified opening time, or at the minimum and the like. Stuck injector profiles may be obtained by, for example, epoxying a fuel injector closed to prevent movement or the fuel system may be operated at a fuel pressure which is high enough that it prevents the injector from opening because the injector voltage cannot overcome the spring force. In either instance, the injector will not open in response to a command to open. In this manner, the system and method provides a robust diagnostic across a wide variety of fuel injectors.

Figure 5:
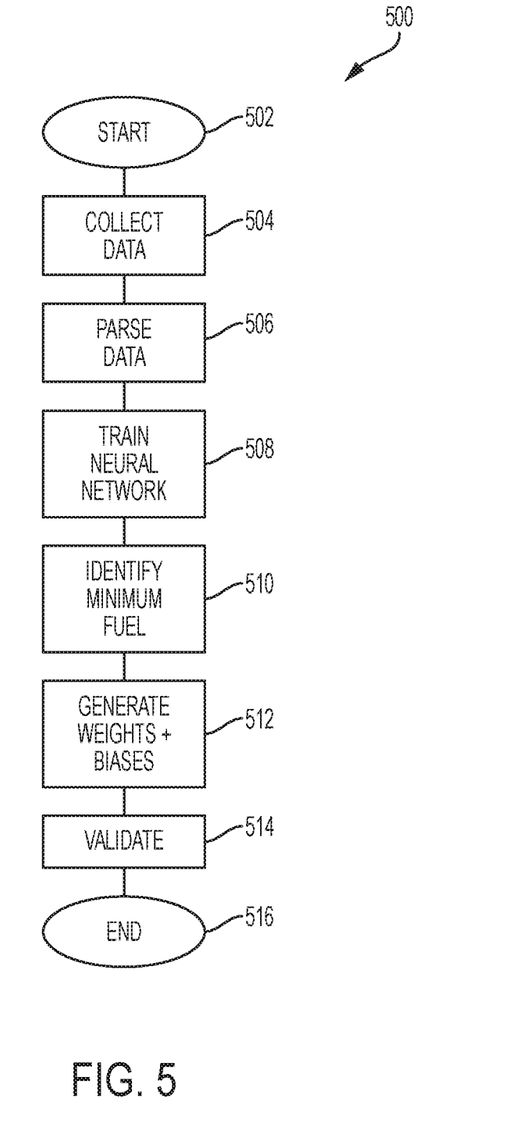
FIG. 5 is a flowchart 500 of an exemplary method in accordance with the present disclosure.

FIG. 5 illustrates a flowchart 500 for an exemplary missing fuel injection neural network training method in accordance with the present disclosure. The method starts at step 502 and continues to step 504. In step 504, injector characterization data is collected for nominal, aged, limit, and stuck fuel injectors. The method then continues to step 506 where the data is parsed into voltage and mass rate of injection data. The method then continues to step 508 where the parsed data is fed into a pattern based neural network in order to train the neural network. The method then continues to step 510 where the minimum fuel quantity that provides a desired statistical separation for a diagnoses of fuel delivery and no fuel delivery is determined. The method then continues to step 512 where weights and bias calibrations corresponding to the pattern based neural network are created and the method then continues to step 514. In step 514, the trained, pattern based neural network is incorporated into fuel injector control system for a vehicle propulsion system and the accuracy of the diagnostic method and system may be validated. In particular, the weights and bias calibrations determined in step 512 may be incorporated in a neural network incorporated into a fuel injection control and diagnostic system and method. The method may then continue to step 516 where the method ends. In an exemplary embodiment, the method may further determine the start and end times for data collection to be used for training the pattern based neural network and for diagnosing a missing fuel injection event in a controller incorporating the pattern based neural network. This may reduce and minimize the amount of data and the workload of a processor. Further, this may enable a reduced amount of time between each injection event in a multiple fuel injection scheme which may enable, for example, additional fuel injection events.

Figure 6:
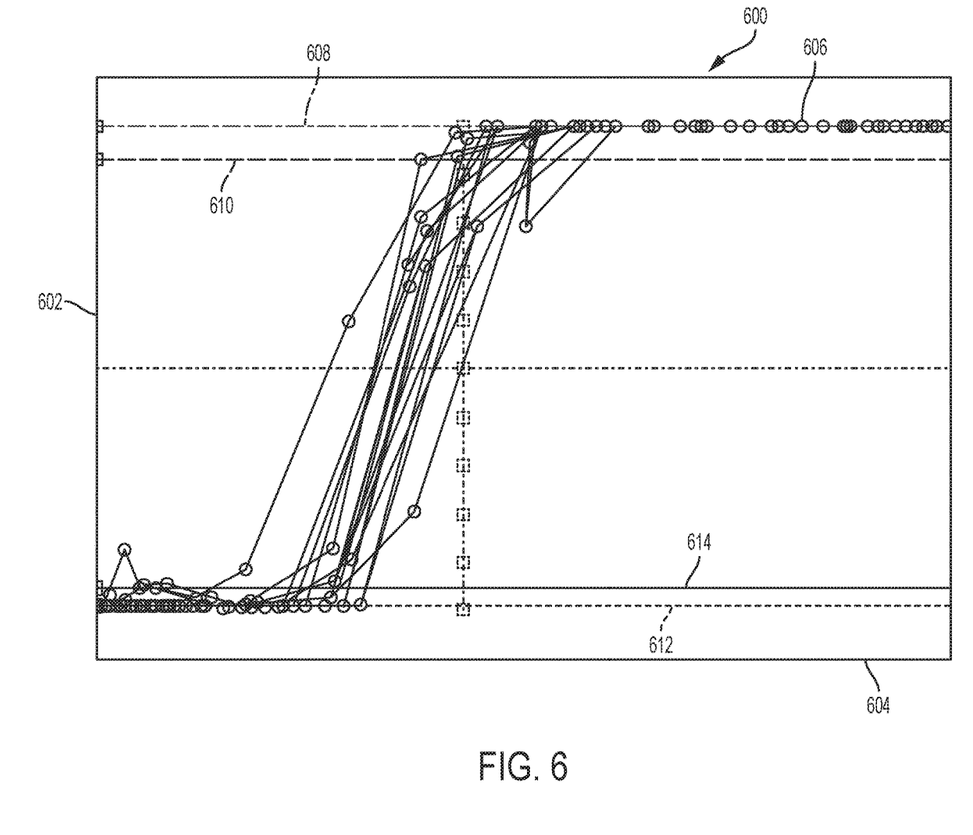
FIG. 6 is a graph 600 illustrating a statistical separation of diagnostic inferences of fuel injection events in accordance with an exemplary embodiment of the present disclosure.

FIG. 6 is a graph 600 illustrating a statistical separation of diagnostic inferences of fuel injection events in accordance with an exemplary embodiment of the present disclosure. The vertical axis 602 of the represents the diagnostic prediction of either a successful fuel injection event or an unsuccessful fuel injection event and the horizontal axis 604 represents an amount of fuel that is injected. Each dot 606 on the graph represents a diagnostic prediction for individual fuel injection events. The graph 600 of FIG. 6 may be compared with the graph 400 of FIG. 4 to understand the significant improvement which is provided with an exemplary embodiment of the method and system of the present disclosure. Line 608 represents the average of a good pulse (successful fuel injection) and then four sigma from that average is line 610. Line 612 represents the average of a bad pulse (unsuccessful fuel injection) and then two sigma from that is line 614. With this statistical method, a minimum fuel amount may be selected which results in satisfactory separation between lines 610 and 614. In this exemplary embodiment, the minimum fuel mass for each fuel injection event was about 2.4 milligrams. This is significantly less than the minimum fuel of 6.7 milligrams using conventional methods and systems as illustrated in FIG. 4. As explained previously, the ability to provide smaller minimum fuel quantities is highly desirable and may be critically important for fuel injection schemes which provide multiple fuel injection events for each combustion event.

Figure 7:
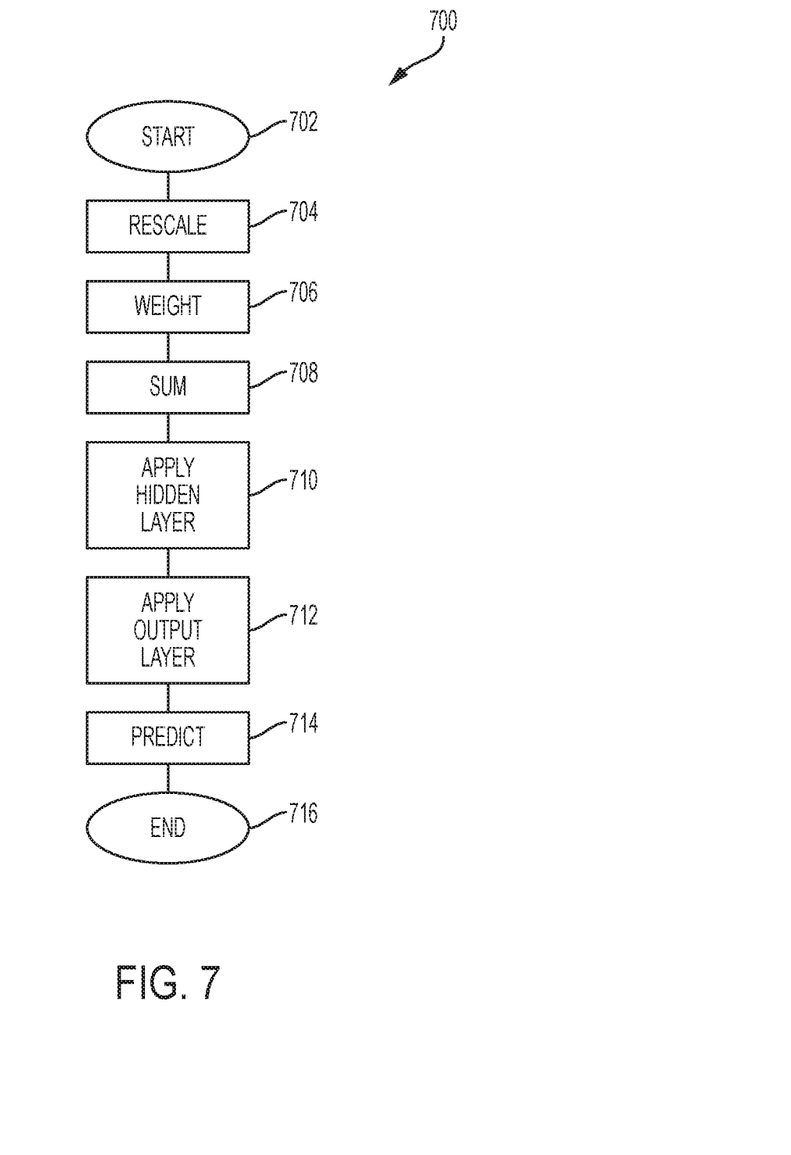
FIG. 7 is a flowchart 700 of an exemplary method of diagnosing a missing fuel injection in accordance with the present disclosure.

In an exemplary embodiment, the diagnostic module 270 in the engine control module 110 of a vehicle propulsion system executes the method of the flowchart 700 of FIG. 7. The method starts at step 702 and continues to step 704 where a sampled voltage is rescaled by subtracting a calibrated value and continues to step 706. In step 706 the method weights the rescaled voltage by multiplying with a gain and the method continues to step 708. In step 708 the method sums the rescaled and weighted value with an additional calibratable gain. The method then continues to step 710 where the method applies a bias to the rescaled, weighted and summed voltage value using a hidden layer of a trained, pattern based neural network. The method then continues to step 712 where the method adds a bias and multiplies with a weight and continues to step 714. In step 714, the method applies another exponential function which predicts either a zero or one, which corresponds to a successful fuel injection and an unsuccessful fuel injection, respectively. The method then ends at step 716. In this manner, the engine control module uses a diagnostic module that incorporates a pattern based neural network to diagnose a missing fuel injection. The gains and weights used in the diagnostic method and incorporated into the neural network method and system may be provided using a combination of traditional calibration techniques and created from the training process for the pattern based neural network.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A fuel injection system for a vehicle propulsion system, the system comprising:
    an injector driver module that applies power to a fuel injector of an engine in the vehicle propulsion system for a fuel injection event;
    a voltage measuring module that measures first and second voltages at first and second electrical connectors of the fuel injector;
    a voltage difference module that determines a difference between the first and second voltages; and
    a diagnostic module with a pattern based neural network that determines whether the fuel injector injected fuel based on the difference between the first and second voltages.

2. The system of claim 1, wherein the pattern based neural network determines whether the fuel injector injected fuel by rescaling, weighting and summing a difference between the first and second voltages.

3. The system of claim 2, wherein the pattern based neural network determines whether the fuel injector injected fuel by applying a bias with a hidden layer of the pattern based neural network.

4. The system of claim 3, wherein the pattern based neural network determines whether the fuel injector injected fuel by applying a weight and bias in an exponential function of an output layer of the pattern based neural network.

5. The system of claim 4, wherein the pattern based neural network determines whether the fuel injector injected fuel by further applying a second exponential function.

6. The system of claim 1, further comprising a malfunction indicator lamp that illuminates in response to the diagnostic module determining that the fuel injector did not inject fuel.

7. The system of claim 1, wherein the diagnostic module stores a predetermined diagnostic trouble code in memory when the fuel injector did not inject fuel.

8. The system of claim 1, wherein the diagnostic module disables a second fuel injection event in a multiple fuel injection scheme in response to the diagnostic module determining that the fuel injector did not inject fuel.

9. The system of claim 1, wherein the injector driver module switches from a multiple fuel injection scheme to a single fuel injection scheme for each combustion event in response to the diagnostic module determining that the fuel injector did not inject fuel.

10. A method for controlling fuel injection for a vehicle propulsion system, the method comprising:
applying power to a fuel injector of an engine in the vehicle propulsion system for a fuel injection event;
measuring first and second voltages at first and second electrical connectors of the fuel injector;
determining a difference between the first and second voltages; and
determining whether the fuel injector injected fuel based on the difference between the first and second voltages using a pattern based neural network.

11. The method of claim 10, wherein determining whether the fuel injector injected fuel comprises rescaling, weighting and summing a difference between the first and second voltages using a pattern based neural network.

12. The method of claim 11, wherein determining whether the fuel injector injected fuel further comprises applying a bias with a hidden layer of the pattern based neural network.

13. The method of claim 12, wherein determining whether the fuel injector injected fuel further comprises applying a weight and bias in an exponential function of an output layer of the pattern based neural network.

14. The method of claim 13, wherein determining whether the fuel injector injected fuel further comprises applying a second exponential function.

15. The method of claim 10, further comprising illuminating a malfunction indicator lamp in response to determining that the fuel injector did not inject fuel.

16. The method of claim 10, further comprising storing a predetermined diagnostic trouble code in memory in response to determining that the fuel injector did not inject fuel.

17. The method of claim 10, further comprising disabling a second fuel event in a multiple fuel injection scheme in response to the diagnostic module determining that the fuel injector did not inject fuel.

18. The method of claim 10, further comprising switching from a multiple fuel injection scheme to a single fuel injection scheme for each combustion event in response to the diagnostic module determining that the fuel injector did not inject fuel.

* * * * *